Aug. 28, 1956 H. A. QUIST 2,760,373
LIQUID LEVEL AND TEMPERATURE INDICATOR
Filed Dec. 24, 1952 3 Sheets-Sheet 1
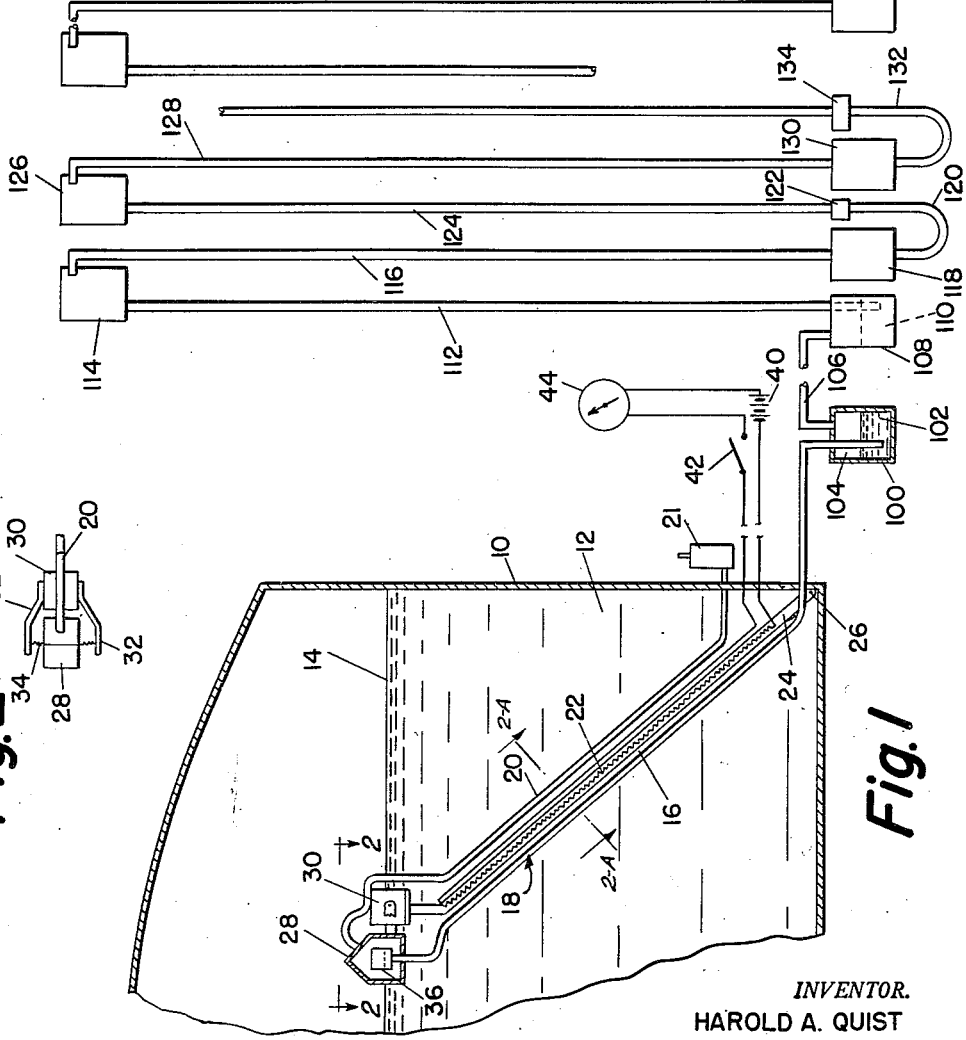
INVENTOR.
HAROLD A. QUIST
BY
Robert D. Spurdle
ATTORNEY Aug. 28, 1956  H. A. QUIST  2,760,373
LIQUID LEVEL AND TEMPERATURE INDICATOR
Filed Dec. 24, 1952  3 Sheets-Sheet 3

INVENTOR.
HAROLD A. QUIST
BY
Robert D. Spindle
ATTORNEY

United States Patent Office 2,760,373
Patented Aug. 28, 1956

2,760,373

LIQUID LEVEL AND TEMPERATURE INDICATOR

Harold A. Quist, Swarthmore, Pa., assignor to Sun Oil Company, Philadelphia, Pa., a corporation of New Jersey Application December 24, 1952, Serial No. 327,726

2 Claims. (Cl. 73—317)

This invention relates generally to liquid level measuring devices and particularly to such devices which translate liquid pressures by liquid means into an indication of the elevation of the liquid level.

Devices of this type have not been sufficiently accurate, in the past, because of natural and structural difficulties experienced on both the liquid-level sensing end and the indicating or recording end of the systems. Taken together the errors encountered in the respective parts of such a measuring device were cumulative and resulted in erroneous readings.

Considering the liquid-level sensing elements separately from the indicating mechanism, the prior art frequently uses the pressure existing in the body of the stored liquid as the operating means. This is accomplished by placing a pressure responsive means adjacent the bottom of a storage tank or other receptacle and reading the results on a liquid column connected thereto. Such a device does not consider the effects of temperature changes nor the stratified variations in specific gravity present in the liquid mass to be measured, as existing, for example, in petroleum products. It is an object of this invention to provide a device which accurately senses and transmits all changes in liquid level as a function of pressure which is free of the characteristics of the stored liquid.

Having accurately positioned the level of a body of liquid by the level sensing end of the mechanism, it is necessary to transmit that information to an equally accurate device for indicating or measuring it. The transmission of this pressure to an indicator such as a manometer reading liquid level in terms of liquid pressure has, in the past, been subject to several disadvantages. A direct reading for large storage tanks, as in the petroleum industry, has required measuring tubes of equal height. If the elements of such an indicator were reduced, accuracy was lost and the device became worthless. It is, therefore, a further object of this invention to provide a liquid level indicator, liquid operated, adapted to amplify the changes in liquid levels for accurate fractional reading, yet is of a size easy to install and read.

In the petroleum industry, it is necessary to consider volatile liquids which form a large part of the stored products. The marketable value of such volatile products is based upon their respective volumes at an agreed temperature. As this agreed temperature is seldom, if ever, that of either a part or the average of the stored volume, it is necessary to know the temperature, particularly the average temperature of the stored liquid, to adjust the liquid volume accordingly. It is, therefore, still another object of this invention to facilitate the determination of volumes of stored volatile liquids with a high degree of accuracy.

With these and further objects in view, the invention consists in the arrangement and combination of the parts hereinafter described, claimed and shown in preferred form in the drawing in which:

Figure 1 is an elevational view partly in section, graphically representing the device as applied to a fixed roof storage tank.

Figure 2 is a section of Figure 1 taken along line 2—2.

Figure 2-A is another sectional view of Figure 1 taken along line 2-A—2-A.

Figure 3:
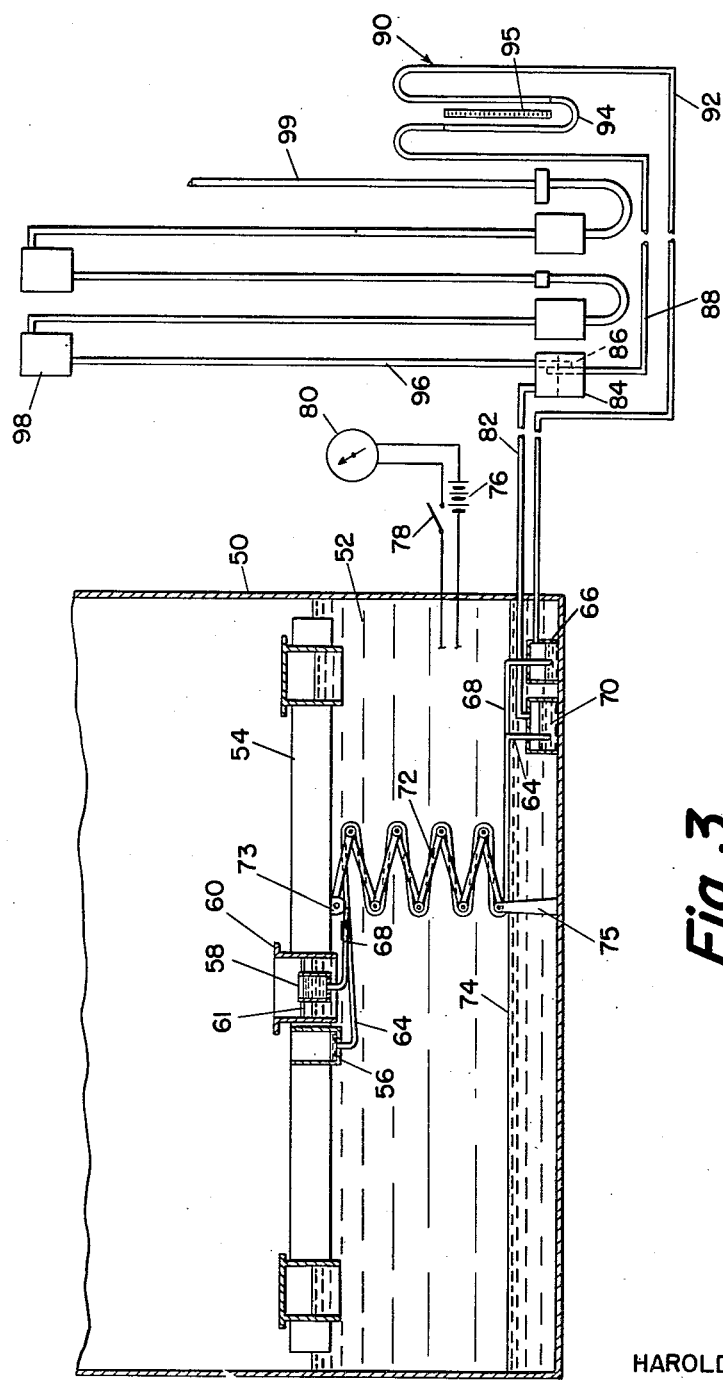

Figure 3 is an elevational view partly in section, graphically representing the device as applied to a floating roof storage tank.

Figure 4:
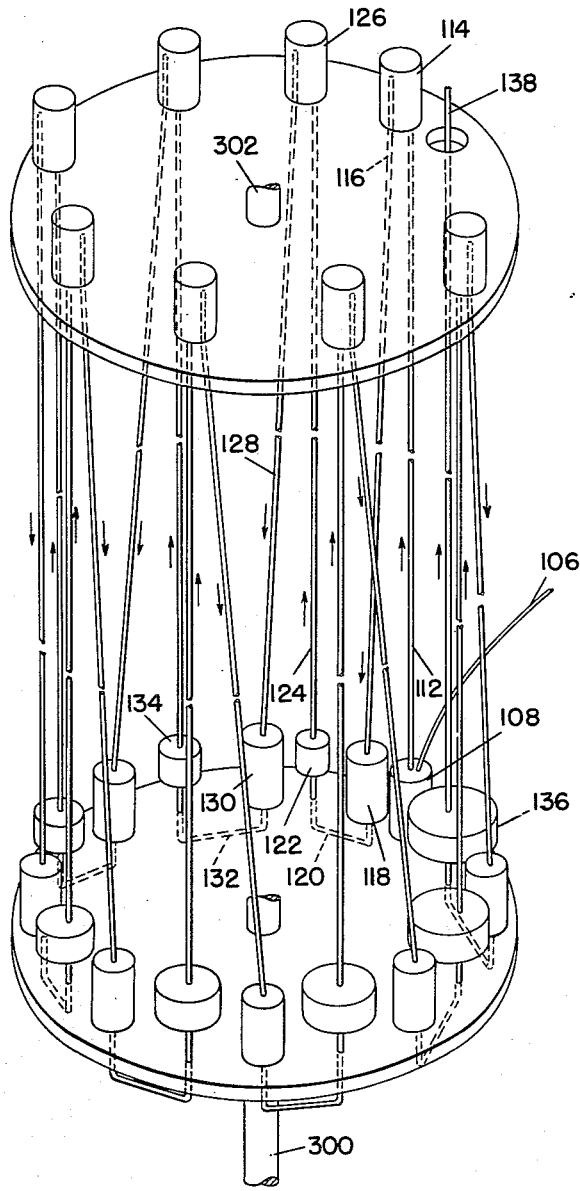

Figure 4 is an elevational view, in perspective, of a preferred form of the level indicator.

The remote indication of liquid levels by means of pressure through liquid means introduces problems of relative volumes as affected by temperature. As previously indicated, in a simple form of device the stored liquid can be connected directly to a tall tube vertically positioned at the reading point. To be effective such an arrangement must be level with the storage tank and the liquid volume to be measured must be small. With these restrictions met, although the liquid level can be read, it is not accurate for the problem of temperature and its effects must still be corrected.

Such a simple device as outlined above will not fill the need under present storage requirements where very large tanks are placed at varying elevations relative to the pump or other control building. It is, therefore, necessary to confine the use of the above suggested mechanism for direct reading to storage facilities of limited size properly positioned.

As has been indicated above, to apply the principles of liquid level measurement by liquid pressure it is necessary to sense the liquid level changes by means other than the stored liquid. The effects of natural conditions such as pressure and temperature on this level sensing means must be reasonably constant and, consequently, predictable. And finally, the indicating device adapted to receive the information from the level sensing means must be within easy reach and accurate within required limits.

According to the present invention advantage is taken of the difference between the specific gravities of known liquids so arranged as to amplify the pressure of a column of one liquid. The initiating liquid is responsively positioned in the body of stored liquid, to clearly indicate the stored liquid level. Additionally the controlled position of the body of pressuring liquid within the storage tank is used to determine the locus of the average temperature surrounding it, the measurement of which is necessary for accurate determination of both the liquid level and the actual volume in the storage container. The effect of temperature differences between the level sensing end of the device and the indicator is controlled by liquid selection and/or measurement, and the indicating device is maintained under constant temperature conditions. Finally, advantage is taken of the immiscibility of certain liquids to separate reading liquid columns from liquid pressure transmitting columns in a manometer of multiple legs for the additive reading of large volumes of liquid in an instrument of limited dimensions.

In the drawings, the two common forms of storage tanks requiring liquid level indicators are shown as fixed and floating roof types. A pressuring column of liquid is maintained in sensing relation with the stored liquid level by float elements which also support the temperature sensitive elements in proximity therewith. The extended manometer which adds the stored liquid depths, partially indicated on the separate legs, is shown both graphically and as a finished instrument in the figures of the drawing. The floating roof tank is further supplied with an additional indicating device which will be fully explained in the detailed explanation following.

Referring now to the drawings, Figures 1 and 2 show the details of the preferred embodiment employed with the fixed roof tank indicated by the numeral 10. A body of stored liquid 12 is indicated with a level as at 14. It will be understood that this liquid level raises and lowers within wide limits at irregular intervals of time. The exact position of this liquid level as read from a position remote from the tank is the purpose of this invention.

Due to the weight of the level sensing liquid 16, of high specific gravity such as mercury, contained in tube 18, and the additional weight of the atmosphere conducting tube 20, the electrical conductors 22 of the temperature detecting device and the support 24 shown hinged to the bottom of the tank 10 at 26, a double float 28 and 30 is arranged as the support. Figure 2 shows the floats 28 and 30 linked in tandem by a yoke 32 and a flexible wire connector 34 which permits flexibility necessitated for movement between extreme positions.

Whereas the float 30 is a simple hollow container serving no other purpose than to buoyantly support the listed elements with the help of float 28, this latter float serves other purposes. Within the body of the float 28, a cup 36 is mounted to receive the tube 18 into the bottom thereof. The liquid 16 which fills the tube 18 is free to enter the cup and leave it as the float 28 lifts and falls. By adjusting the quantity of heavy liquid 16 in the float 28 and tube 18, the level of the stored liquid 14 can be substantially approximated for all changes in elevation within the normal operating limits. Also tube 20, connected to the atmosphere outside the tank 10 through the drier container 21, equalizes the pressure on the liquid level sensing end of the liquid indicating device with a like atmospheric pressure at the end of the indicator, as will be fully understood after reading the description of the operation of the device.

The temperature sensing elements are shown here as a simple electrical conductor 22 mounted to be adjacent the pressuring liquid column 16 throughout its effective length in the liquid. Electrical energy from a power source, such as the battery 40, is passed through the conductor 22 by operation of the switch 42. The conductor 22 is selected for its variable conductivity in response to temperature changes. An indicator 44, calibrated to read temperatures as a function of this change in conductivity of conductor 22, is connected in series therewith.

The modified form of manometer shown in graphic representation to the right of Figure 1 is used as the liquid level indicating mechanism for both the fixed roof tank shown in this figure, as well as for the movable roof tank shown in Figure 3. Therefore, a description of this modified form of manometer will be given as relating to both types of storage tanks after the liquid level sensing device for the movable roof tank, as shown in Figure 3, has been described.

Reference to Figure 3 shows a floating roof tank 50 in which the stored liquid 52 supports a representative form of floating roof 54 at a varying level. Within the body of the floating roof 54 and located at approximately the center thereof are shown two receptacles or reservoirs numbered respectively 56 and 58. The receptacle 58 is centered within a larger opening 60 and suspended adjustably therein as by the spider 61. The floating roof 54 serves the purpose of the float 30, described in Figure 1 as a supporting member, for both the receptacles 56 and 58.

A tube 64 connects the receptacle 56 to a closed container 70 mounted on the bottom of the storage tank 50. A like tube 68 connects the receptacle 58 with a similarly constructed container 66, also mounted on the bottom of the storage tank 50. The containers 66 and 70 are closed and sufficiently rigid to withstand the liquid pressure without affecting their contents and are placed inside the tank to take advantage of the fairly uniform temperature existing there. They may be placed underground or in insulated surroundings outside the tank. Both of the tubes 64 and 68 are flexible in nature and are adapted to engage and flex with the jointed mounting member 72 linking the liquid supported float 54 with the lower part of the storage tank 50 at any desired level dependent on storage conditions. A bracket 73 connects the hinged support 72 to the float and is supported at the proper elevation above the bottom of the tank by bracket 75.

An electrical device for measuring the average temperature of the tank contents along the exterior surface of the tubes 64 and 68 includes a conductor similar to that shown in Figure 1, omitted here for clarity. An electrical circuit also similar to that shown in connection with Figure 1, including a battery 76, a switch 78 and a calibrated electrical responsive indicator 80, together with the proper connecting wires, is electrically coupled to the conductor.

To insure the balance of pressures on the sensing end of the liquid level measuring device the receptacles 56 and 58 are open to the pressure conditions above the floating roof 54. This insures atmospheric pressure effective on the level sensing end of the mechanism which counterbalances like pressure on the open end of the indicating device to be considered later.

Reference to both Figures 1 and 3 will show a graphic representation of the modified manometer used to translate a pressure of the liquid in the conduits which, by means of the float arrangements, transmits a pressure indicative of the stored liquid level. One form the indicating device may take is shown in Figure 4. The simplest form is of the graphically represented device as shown in Figure 1 and will be described first.

Connected to the lower end of tube 18, described as attached to the hinged support 24 and opening into the float 28, is a sealed container 100 in which a quantity of mercury 102, or liquid of relative high specific gravity, fills the lower portion thereof. Above the mercury in the container 100 a liquid 104, which may be water treated against freezing or a like liquid of less specific gravity than the mercury or mercury substitute, fills the remainder of the container 100 and also the tube 106 which extends from the immediate vicinity of the tank 10 to the desired location for mounting the manometer indicating device. This distance may be either short or long and the elevation of these respective elements is immaterial, as will be fully understood after reading a description of the operation of this device. Further, depending upon the choice of liquid 104, the pressure transmitting tube 106 may, if necessary, be buried in the ground or otherwise insulated.

Tube 106 filled with the selected lower gravity liquid is connected to receptacle 108, which forms the initial pressure reading flask of the modified manometer indicating device. In the bottom of the receptacle 108 a quantity of a high specific gravity liquid 110 is sufficient in volume to cover the bottom of the first reading leg 112 under all pressure conditions. This liquid 110 may either be the same as 102 previously noted, or may be different liquid. The only requirements are that the lower of two liquids throughout this mechanism must be heavier than the liquid above it, and they must be immiscible one with the other. The reading column 112 is filled with a less specific gravity liquid like or similar to that used to the previously recited elements of the device, which, because of the difference in specific gravity between the heavy and light liquids, fills the reading tube 112 and the initial overflow receptacle 114 at the top of the apparatus. The pressure transmitting tube 116 connects the overflow receptacle 114 with the second reading receptacle 118, which also has a quantity of heavy liquid therein, as indicated. From the bottom of the second reading flask 118, a tube 120 connects with a third form of receptacle number 122, which can be considered as a rectifier as it absorbs the differential volume created in multiplying the reading and pressure transmitting tubes. The rectifier receptacle 122 is the first of a number of like volumes which are repeated throughout the indicator in varying sizes to accommodate the displaced liquid reading and pressure transfer volumes.

The second reading tube 124 rises from the rectifier receptacle 122 into the second overflow receptacle 126. From this second overflow receptacle a pressure transmitting tube 128 similar to number 116, previously described, transmits the accumulated pressure and displaced liquid volumes downwardly into the third reading flask 130, as shown. Again the accumulated volume of the preceding pressure transmitting tubes is absorbed in a second rectifier numbered 134, transmitted thereto through tube connector 132.

It will be noted that the accumulated volumes which must be received and maintained in proper level with the intermittent heavy liquid reading tubes, and the lighter liquid filled pressure transmission tubes must be consecutively absorbed by the rectifier volume receptacles numbered 122 and 134. This is indicated, as required, in Figures 2, 3 and 4 by changing diameters of these rectifier receptacles.

It will be evident, and is indicated in connection with this Figure 1, that the number of tubes may be multiplied to meet the requirements of any height which the liquid level may assume above the indicating mechanism. As will be more clearly understood later in this specification, the example which explains the presently operating mechanism requires the rectifier volume of the final reading tube to be eight times that of the initial rectifier. Consequently, the drawing shows the tube structure broken and the final rectifier 136 is eight times the volume of the initial rectifier 122. It should be noted that back pressure in the device caused by the rectifier receptacles has been reduced as far as possible by maintaining the static hydraulic head at a minimum by varying the diameter, rather than the height, of the receptacles to obtain volume variations.

The basic structure of the indicating device shown graphically in connection with Figure 3 will be recognized as containing the same elements above described in connection with Figure 1. The heavy liquid content of the sealed container 70 is connected by water or lighter liquid through the tube 82 to the top of the initial reading flask 84, which has a volume of heavy liquid therein noted as 86. At this point there is a modification of the device over that previously discussed in that there is a tube 88 connected from the bottom of flask 84 through a single manometer element generally noted as 90 and returned through tube 92 to the top of the sealed container 66 mounted in the bottom of the tank 50. By means of adjusting the liquid levels to desired elevations in the float containers 56 and 58, respectively, it is possible to read a differential elevation in the indicating liquid shown as 94 having two levels both of which are shown in the manometer 90 against the scale 95 placed between them.

Returning to the stored liquid level indicating device, the initial reading tube 96 connects the overflow receptacle 98 with the initial reading receptacle 84, as has been explained for a similar arrangement with reference to the indicator mechanism of Figure 1. The remaining indicating, overflow and rectifier flasks or receptacles are clearly shown and serve the same purposes in the same way as has previously been disclosed in connection with Figure 1 and will not be repeated here.

It will be noted that the last reading tubes numbered 138 and 99 in Figures 1 and 3, respectively, are open to atmospheric pressure, which as the atmospheric pressure has been admitted to the liquid level sensing floats eliminates any necessity for introducing other means to balance this pressure, as it is effective on both open ends of the pressuring liquids. This pressure at each end of the device requires only that it be equal and balanced. A like result may be obtained by connecting to other balanced pressures or simply connecting both these open ends of the mechanism together.

To those versed in the art, the description of the elements previously given will undoubtedly indicate the operating features in full detail. However, to emphasize the advantages of the disclosed device and further distinguish the combination as modified from the existing art, a detailed description of the operation of the mechanism and the advantages will be given. Reference will be made to all the figures in the drawing and Figure 4 will be stressed as an economic form of indicating device developed to support the modified manometer shown graphically in Figures 1 and 3.

Considering Figure 1 first, as a complete understanding of this figure will leave little to be added in describing Figures 3 and 4, the addition and removal of stored liquid or temperature change, for example in a stored quantity of a petroleum product, will raise and/or lower the liquid level 14. The amount of resulting increase or decrease in stored liquid volume will be reflected by the level of the liquid standing in the storage tank at any time. This is, however, affected by temperature conditions existing in and around the tank which must be considered in obtaining the corrected liquid level from that indicated as well as correctly measuring the volume.

The float arrangement shown in Figures 1 and 2 is adapted to follow the increasing or decreasing liquid level 14 as it assumes its position in the storage tank regardless of whether that position has been increased or decreased over what it should be theoretically, because of temperature or other modifying conditions. By adjusting the elevation of the cup 36 relative to the float 28, the heavy liquid filling the tube 18 can be arranged at substantially the level of the stored liquid 14 for all elevations. The heavy liquid which fills the tube 18 is thus maintained at a volume sufficiently great to reach through the tube 18 from the liquid level down to the sealed container 100 by the overflow capacity of the float 28. It will be obvious that the pivoted float arrangement lowered to an almost horizontal position will displace heavy liquid which will again be absorbed into the tube system as the floats lift and the tube 18 approaches a vertical position. Further as the level of the pressuring liquid 16 coincides with the level of the stored liquid, the pressure of the liquid column reflects, substantially, the physical elevation thereof.

The liquid 16, as it lifts and lowers, transmits this pressure dependent upon the vertical distance reached by the liquid level into the sealed container 100 which raises or lowers the level of the heavy liquid volume 102 therein. This pressure condition is transmitted through the liquid pressure transmission medium noted above as water or some like lighter liquid, which is transmitted in turn through tube 106 to the initial measuring receptacle 108 in the manometer device.

The electrical conductor 22 arranged to be exposed to the different thermal strata of the stored liquid 12 may be switched on or off as desired to obtain a reading of the average temperature within that body of liquid. With this information, the known liquid level indicated on the reading legs of the modified manometer, as later described, can be volumetrically adjusted to a basic temperature for purposes of measurement. This is readily understood by those versed in the art and requires simply the consultation with prepared tables and the application of a multiplier which varies for different temperatures and different volumes.

To continue with the transmission of pressure as determined by the mercury column within the storage tank, the initial reading leg 112 of the manometer will reflect the liquid level within the lowest few feet of the storage tank. For example, in an experimental device a 40 foot possible liquid depth is measured by the disclosed modified manometer, using mercury and water, having 9 indicating legs. Therefore each leg roughly measures 5 feet elevation in the 40 foot liquid depth. This shows as a measurement on the initial reading leg only if the stored liquid level is within or below the first 5 foot mark of the storage tank reading from the bottom to the top.

Therefore, considering the stored liquid volume to be at approximately the 38 foot mark, as illustrative, the first 7 reading legs of the manometer will show complete heavy liquid or mercury columns and the eighth leg will show a column 3/5 filled with the heavy liquid which will stand at the 38 foot graduation.

In order to maintain the regularity of measurement in each separate reading leg of the manometer, the pressure transmitting fluid such as water or other lighter liquid must be moved upwardly through the reading leg into the overflow receptacle at the top thereof and at the same time displace a volume equal to the reading leg to transmit pressure downwardly into the successive heavy liquid containing receptacles. At this point, it is necessary to introduce the rectifier flasks which are receptacles, as indicated above, of selected volumes placed within the manometer circuit to absorb the previously accumulated volume in order to maintain the correct elevational reading of the proportionate stored liquid elevation as the additional legs of the device are brought into use.

Reference to Figure 3 will indicate that the modifying manometers described above are used to measure the level of the stored liquid volume in the same way and with the same results as above described. As an additional reading particularly useful where floating roof tanks are concerned, the float 56 has measured within it a volume of heavy liquid indicating the bottom or contact surface of the floating roof 54. Within the opening 60 a volume of heavy liquid is also maintained at the level of the displaced liquid surrounding the floating roof 54. The respective pressure changes in the floats 56 and 58 are transmitted through the tubes 64 and 68 to the sealed containers 66 and 70. The tubes 88 and 92 connect two sides of a simple manometer to receive these differential pressures. A colored liquid 94 immiscible with the pressure transfer liquid in the manometer will readily indicate, on the scale 95, the difference in elevation between the heavy liquid levels in the respective float chambers. This gives a direct reading of the differential between elevation of the supporting surface of the liquid and the displaced liquid surface which surrounds the float for volume calculations.

The form of apparatus which has been found most satisfactory with regard to ease in installation and also ease in reading is shown in Figure 4. For ease in identifying the various elements of this modified manometer, the numbering of the different receptacles and the reading and pressure transmitting legs is arranged to follow that shown in Figure 1. The shafts 300 and 302 balance the cylindrical form of the device so that it may be rotated for ease in reading. The graduation necessary to translate the heavy liquid height on the reading legs to an indication of the liquid level in the storage tank have been omitted from this figure for clarity. However, a simple graduation on the tube edge or a metallic or paper scale clipped to the tube is all that is required. To facilitate rotation, the connecting tube, here shown as 106, is flexible and permits rotation in either direction up to 180 degrees.

The principles and structures disclosed are further applied in the form of an additional example using two different heavy specific gravity liquids in multiplying relation, set forth here for clarification of the invention. In this second experimental device, mercury is used as the pressuring liquid in the submerged tube within the storage tank and extends to fill the lower portion of a sealed container of the pressure transmission elements. Within this pressure transmission section from the flask at the bottom of the pressure tube in the tank to the initial reading flask, water is the pressure transmitting medium. In the multiple legged manometer, water, treated with a coloring matter, is the pressure transmitting medium while the indicating liquid is the second of the two heavy liquids, tetrabromaethane.

This combination of mercury and tetrabromaethane separated by water makes a very satisfactory device. As water is non-compressible and non-expansible under normal conditions, it will readily transmit the mercury column pressures to the tetrabromaethane and therebetween in the manometer. The relative specific gravities, 13.6 for mercury and 2.964 for tetrabromaethane, indicate their comparative responses. For every unit of pressure change in the mercury, there will be approximately 4.5 times greater lineal response in the tetrabromaethane. Consequently, the least change in elevation of the mercury is magnified many times affording great accuracy.

The effect of temperature is minimized by reducing the volume of mercury used in the storage vessel to a minimum, and by adjusting the manometer reading to correct the temperature effect surrounding the modified manometer. On the level sensing end of the system, the mercury carrying conduit has an internal diameter approximating 1/8 inch. In comparison the volume of the chamber 36 in the float 28 is infinite. Therefore, the effect of temperature on the density of the mercury in the column within the conduit only need be determined. The coefficient of expansion of mercury at 60°, the standard for measuring volumes of petroleum products, is .0001 and for gasoline is .0006. The net correction factor for volume calculations is, therefore, .0005 at 60 degrees F. This information can be readily calculated for other temperatures and compiled for ready use similar to presently used volume tables. The average temperature affecting the volume of stored liquid is easily read from the electrical gauge 80 or like mechanism.

The manometer, for best results, is maintained in constant temperature surroundings by using a water bath or temperature controlled atmosphere. Once established to read the pressure effect in the storage vessel at 60° and maintained at a selected temperature by the control adopted, only the effect of the temperature on the mercury column in the storage vessel need be adjusted. As indicated above, the volume of the stored gasoline will increase or decrease under the effects of rising or falling temperatures. The mercury column will not be increased or decreased in length commensurate with the rising and falling of the float, as the mercury volume in the floated reservoir is very large compared with the small volume of the mercury column in the conduit. Therefore the height of the mercury will always remain at the level of the stored liquid. It is necessary, only, to correct the variation in pressure caused by changes in density of the mercury as a result of the temperature changes in the stored liquid.

In both applications of the device as illustrated by Figures 1 and 3, means are indicated for measuring average temperature along the pressuring column of mercury. As the device is calibrated at 60° F. to indicate the liquid level when both the density of the mercury in the storage tank and the manometer liquids need no correction, this is considered as the basic reading. The change in density of the mercury for temperatures above and below the normal reading of 60° F. can be readily calculated to reflect pressure variations. Tables are prepared and applied to the manometer to adjust the reading to reflect the exact liquid level. As indicated above, once the true level of the stored contents is known, the application of presently available tables will give both the present volume and corrected volume (at 60° F.) for sales and inventory purposes.

It will be evident that a liquid level reading system is disclosed whereby liquid pressure is the operating force. By using liquid columns different from the stored liquid, the characteristics of this liquid to be measured are avoided, and the effects of natural phenomena are easily calculated and corrected. The result is a device capable of correct and exact measurement within very narrow limits.

The structure described here represents one embodiment of the device which gives these desired results. Other forms will be evident involving the spirit of the invention, but avoiding the letter thereof. This invention is not to be restricted except in so far as is necessitated by the prior art and the spirit of the appended claims.

There is not claimed herein the specific construction illustrated as a multilegged manometer shown as an integral part of Figs. 1 and 3 and as a separate sub-combination in Fig. 4, the same being the subject-matter of a divisional application filed September 21, 1955, Ser. No. 535,571.

The invention claimed is:

1. A liquid level measuring system for use with liquid bodies comprising a float, a reservoir mounted in the float and adapted to maintain a pressuring liquid of high specific gravity at the level of the float contact surface on the liquid body, a second reservoir mounted in the float and adjustable to maintain a like high specific gravity pressuring liquid at the level of the liquid body as displaced by said float, flexible conduit means connecting said reservoirs respectively to sealed liquid containers adjacent the liquid body, a hinged support for said flexible conduit pivotally connected to the float and extending to the bottom of the liquid body carrying the flexible conduit means to connection with said sealed containers, manometer means removed from the liquid body to indicate the level thereof, and pressure transmitting means connecting said sealed containers to the manometer means.

2. A device for continuously measuring the quantity of liquid in a storage receptacle comprising an elongate support member, a conduit enclosed mercury column attached to the support member, pivot means within the receptacle positioning one end of said elongate support member proximate the bottom of the stored liquid mass, float means on the top of the liquid mass connected to the opposite end of the support member, reservoir means in said float means operatively coupled to the conduit and adapted to maintain the mercury supply therein at the stored liquid level, manometer means of multiple legs arranged to indicate the liquid level as a function of the mercury column pressure, each leg thereof indicating a fraction of the maximum stored liquid elevation, and pressure transfer means connecting the conduit in the storage tank with said manometer means.

References Cited in the file of this patent

UNITED STATES PATENTS

| | | |
|---|---|---|
| 62,885 | Quinn | Mar. 12, 1867 |
| 723,040 | Schmitz | Mar. 17, 1903 |
| 2,625,043 | Tapp | Jan. 13, 1953 |
| 2,677,276 | Schmidt | May 4, 1954 |